United States Patent [19]
Tamada

[11] Patent Number: 6,002,105
[45] Date of Patent: Dec. 14, 1999

[54] AIR CONDITIONING CONTROL APPARATUS FOR VEHICLES

[75] Inventor: Takanobu Tamada, Konan, Japan

[73] Assignee: Zexel Corporation, Tokyo, Japan

[21] Appl. No.: 08/979,350

[22] Filed: Nov. 26, 1997

[30] Foreign Application Priority Data

Dec. 2, 1996 [JP] Japan .................................. 8-336404

[51] Int. Cl.⁶ .................................................. B60L 1/02
[52] U.S. Cl. .......................................... 219/202; 454/159
[58] Field of Search ........................... 219/202; 392/347, 392/485, 502; 165/41, 42, 43; 454/156, 159, 160, 161

[56] References Cited

U.S. PATENT DOCUMENTS

| | | | |
|---|---|---|---|
| 4,459,466 | 7/1984 | Nakagawa et al. | 219/367 |
| 4,898,325 | 2/1990 | Sakurada | 237/12.3 B |
| 5,206,476 | 4/1993 | Fresch et al. | 219/202 |
| 5,279,459 | 1/1994 | Single, II | 237/2 |

*Primary Examiner*—Teresa Walberg
*Assistant Examiner*—Thor S. Campbell
*Attorney, Agent, or Firm*—Weneroth, Lind & Ponack, L.L.P.

[57] ABSTRACT

A first PTC heater and a second PTC heater are provided at the downstream side of a heater core that uses engine cooling water for its heat source, and the second PTC heater is positioned at a foot outlet. Under conditions that require the use of the PTC heaters, power is supplied to all the PTC heaters if the discharge mode is set to a FOOT mode or a DEF/FOOT mode, whereas power is supplied only to the first PTC heater if the discharge mode is set to a DEFROST mode. In an air conditioning control apparatus for vehicles provided with a heater core and PTC heaters, warm air at appropriate temperatures can be supplied through both the foot outlet and the defrost outlet during an initial stage of heating in which the temperature of the engine cooling water is low. In addition, since no power is supplied to the second PTC heater unless the foot outlet is open, energy resources are saved.

13 Claims, 4 Drawing Sheets

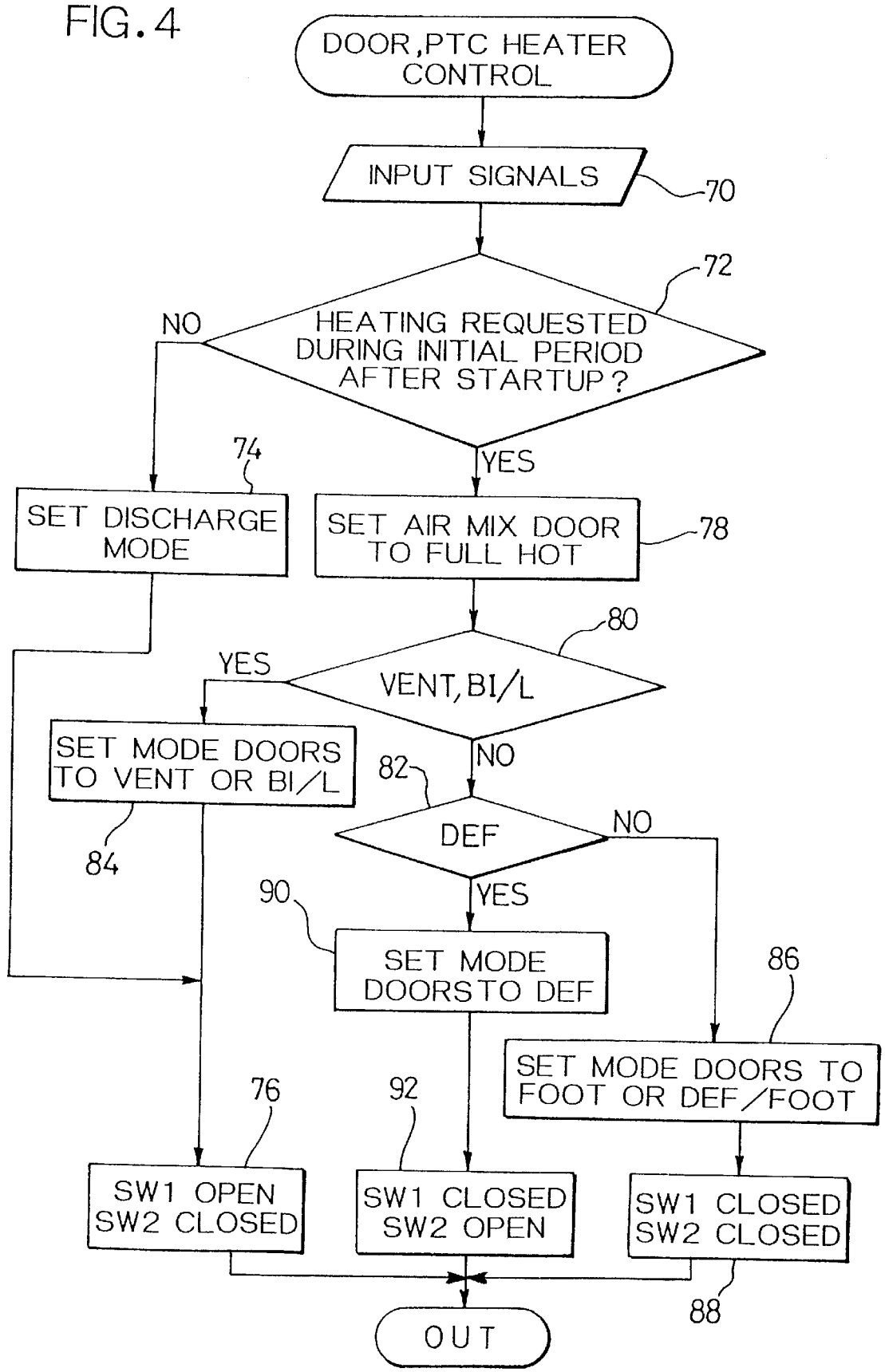

AIR CONDITIONING CONTROL APPARATUS FOR VEHICLES

BACKGROUND OF THE INVENTION

1. Field of the Invention

The present invention relates to an air conditioning control apparatus for vehicles which is provided with PTC (Positive Temperature Coefficient) heaters for boost heating as well as a heater core that uses engine cooling water for its heat source.

2. Description of the Related Art

The prior art for this type of air conditioning control apparatus for vehicles includes, for instance, the type disclosed in Japanese Unexamined Patent Publication No. H 5-169967. In this apparatus, an evaporator and a heater core for controlling air temperature are provided inside an air conditioning duct system. Outlets (defrost outlet, ventilation outlet, foot outlet) that are opened/closed by mode doors are formed at the downstream-most side of the air conditioning duct system. A PTC heater further provided at the foot outlet so that power is supplied to the PTC heater until the temperature of the engine cooling water having rises to a high level so that the heating by the heater core becomes sufficient to assure warm air through the foot outlet.

The structure in the prior art described above is effective for obtaining a comfortable feeling of warmth for passengers since discharge of warm air at the foot level is given priority even during the initial stage of heating, in which the temperature of the engine cooling water is low. However, the structure cannot assure effective defrost during the initial stage of heating, since the PTC heater is provided at the foot outlet only.

In other words, unless the FOOT mode is not selected as the discharge mode during the initial stage of heating (i.e., if the DEFROST mode, which gives priority to removing frost and fog, or the DEF/FOOT mode for simultaneously achieving removal of frost and fog on the windshield and a comfortable feeling of warmth for the passengers is selected) an insufficient quantity of warm air is supplied through the defrost outlet in the structure described above, since priority is still given to discharging warm air at the foot outlet. Consequently, there is no choice but to wait for the temperature of the engine cooling water to increase.

On the other hand, if the quantity of heat supplied through the defrost outlet is set equal to the quantity of heat supplied through the foot outlet, it will become difficult to achieve the feeling of comfort and warmth afforded when the feet are warmed and the head is not subjected to a direct flow of hot air. Thus, if one must choose, it is preferable to put more emphasis on the discharge of warm air at the foot outlet.

In addition, a PTC heater, which utilizes a battery or the like for power, does not contribute to the heating of discharge air if the DEFROST mode is selected during the initial stage of heating. This is because the foot outlet is closed, so no air will then flow around the PTC heater provided at the foot outlet, resulting in a wasteful consumption of power.

SUMMARY OF THE INVENTION

Accordingly, an object of the present invention is to provide an air conditioning control apparatus for vehicles that is capable of supplying sufficiently warmed air when discharging air through a foot outlet during the initial stage of heating while the temperature of the engine cooling water is still at a low level and the heater core has not yet come up to full performance, and is also capable of supplying warm air when discharging air through a defrost outlet. Another object of the present invention is to achieve economical use of energy by appropriately controlling power supply to PTC heaters in correspondence to the selected discharge mode.

In order to achieve the objects described above, the air conditioning control apparatus for vehicles according to the present invention is provided with a fan and a heater core which heats air drawn in by the fan, using engine cooling water as its heat source. Both the fan and the heater core are provided within an air conditioning duct system. A with a foot outlet through which air is discharged at the foot level and a defrost outlet through which air is discharged along a windshield are provided, and these outlets are formed at the downstream side of the air conditioning duct system to supply drawn-in air to the cabin via the outlets that are open.

The structure of this apparatus is characterized in that a plurality of PTC heaters are provided at the downstream side of the heater core, with some of the PTC heaters positioned at the foot outlet. A means for full power supply that supplies power to all of the plurality of PTC heaters when the discharge mode is set at a mode in which the foot outlet is open is provided. In addition a means for partial power supply that cuts off power supply to the PTC heater provided at the foot outlet and supplies power to the remaining PTC heaters when the discharge mode is set to a mode in which the foot outlet is closed is also provided. Both of these power supply means are to be employed when it is necessary to employ the associated PTC heaters.

For instance, if there are two PTC heaters, i.e., a first PTC heater and a second PTC heater, provided at the downstream side of the heater core, the first PTC heater may be provided on the passage where air is guided from the heater core to both the foot outlet and the defrost outlet with the second PTC heater positioned at the foot outlet. In that case, power may be supplied to the first and second PTC heaters when the discharge mode is set to the FOOT mode or defrost/FOOT mode, whereas only the first PTC heater is supplied with power with power supply to the second PTC heater cut off when the discharge mode is set to the DEFROST mode.

Power supply and power cut-off by the means for full power supply and the means for partial power supply for the PTC heaters may be implemented by interlocking with the operation of a switching lever for switching the discharge mode. Alternatively a microcomputer may be employed to calculate and select a discharge mode from a stored control program to perform control of switching of the PTC heaters in correspondence to the selected discharge mode. For instance, if a microcomputer is to be utilized, a medium that stores in memory a control program for: making a decision that circumstances call for the use of the PTC heaters; for supplying power to all of the plurality of PTC heaters when it is determined that the discharge mode is set to a mode in which the foot outlet is open and for cutting off power supply to the PTC heaters positioned at the foot outlet and supplying power to the remaining PTC heaters when it is determined that the discharge mode is set to a mode in which the foot outlet is closed is required.

Consequently, if the discharge mode is set to, for instance, the FOOT mode, in which the foot outlet is open during the initial stage of heating, power is supplied to all the PTC heaters at the downstream side of the heater core. Consequently the air that has passed through the heater core is first heated by the PTC heaters (the first PTC heater) other than the PTC heaters positioned at the foot outlet and then is further heated by the PTC heaters (second PTC heater)

positioned at the foot outlet before it is discharged into the foot level of the cabin.

Likewise, if the discharge mode is set to the defrost/FOOT mode in which the foot outlet is open, the air to be discharged through the foot outlet is heated by all the PTC heaters (as in the case of the FOOT mode) and the air to be discharged through the defrost outlet is only heated by the PTC heaters (the first PTC heater) other than the PTC heaters positioned at the foot outlet. Thus, in the defrost/FOOT mode, the temperature of the warm air discharged through the foot outlet is higher than the temperature of the warm air discharged through the defrost outlet. Therefore, air conditioning control is achieved which gives priority to providing a feeling of comfortable warmth to passengers while, at the same time, assuring a defrost function for the windshield.

If the discharge mode is set to the DEFROST mode, in which the foot outlet is closed, the air that has passed through the heater core is heated by the PTC heaters (the first PTC heater) other than the PTC heaters positioned at the foot outlet and is then directly discharged through the defrost outlet. It is to be noted that since, in this mode, power supply to the PTC heaters (the second PTC heater) provided at the foot outlet is cut-off, and the power required for operating the PTC heaters is reduced compared to that required in the other modes.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings:

FIG. 4 is a flowchart illustrating an example of a control operation performed by the control unit shown in FIG. 3.

DETAILED DESCRIPTION OF THE PREFERRED EMBODIMENTS

Figure 1:
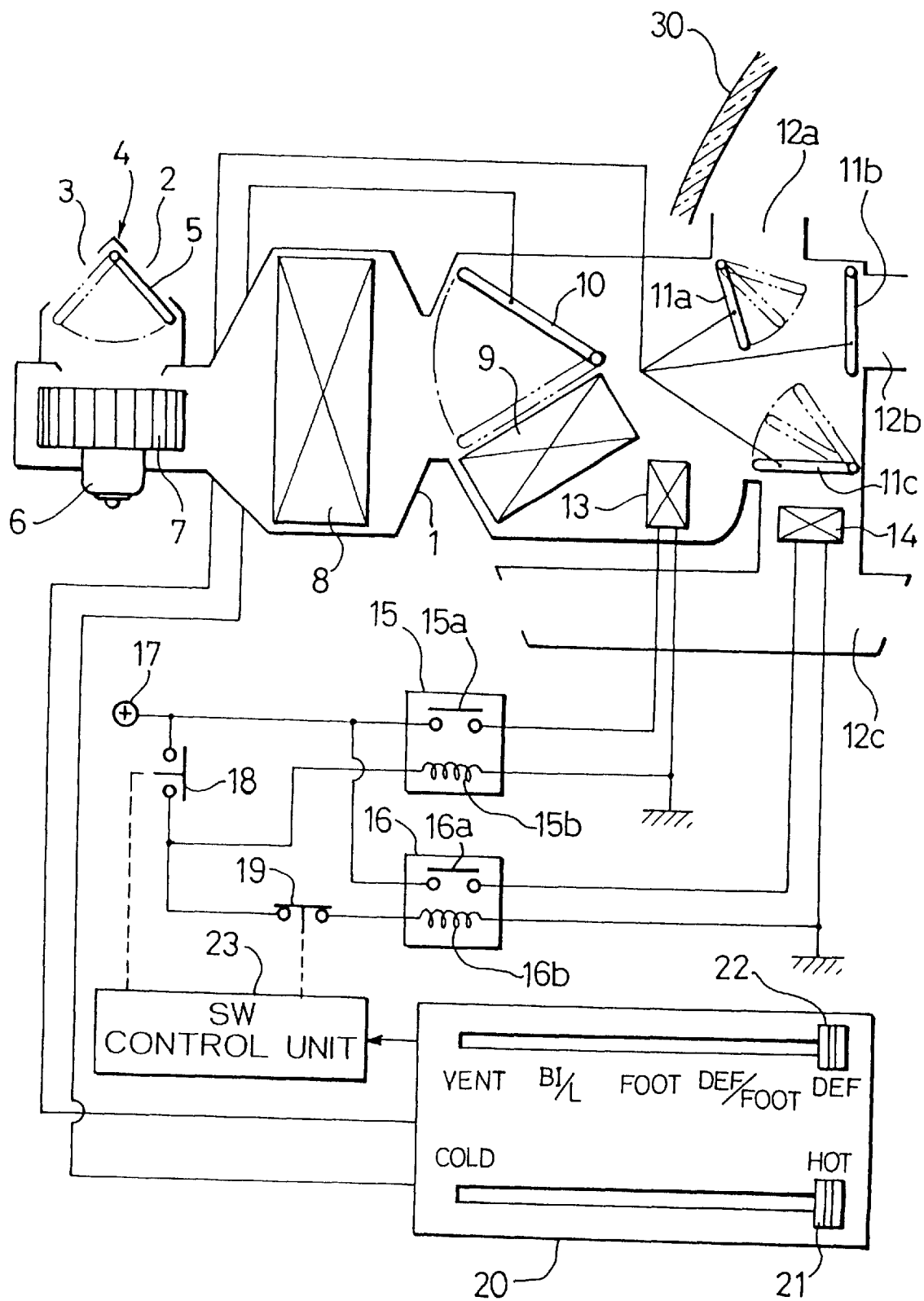
FIG. 1 illustrates a structural example of the air conditioning control apparatus for vehicles according to the present invention.

The following is an explanation of the preferred embodiments of the present invention in reference to the drawings. In FIG. 1, an air conditioning control apparatus for vehicles is provided with an intake switching device 4 having an internal air induction port 2 and an external air induction port 3 at the upstream-most side of an air conditioning duct system 1, and the ratio at which internal air and external air are induced is adjusted by an intake door 5. A fan 7 which is caused to rotate by a motor 6 is provided at the air conditioning duct system 1 facing the intake ports so that the air from the intake ports is drawn in by the rotation of the air blower 7 to be force fed toward the downstream side of the air blower 7.

An evaporator 8 is provided at the downstream side of the air blower 7. The evaporator 8 constitutes a cooling cycle together with a compressor, a condenser, a liquid tank, an expansion valve and the like (not shown), all of which are linked through piping. When the compressor operates, a coolant is supplied to the evaporator 8 to cool the air passing through the evaporator 8.

At the downstream side of the evaporator 8, a heater core 9, which uses engine cooling water as its heat source, is provided, and an air-mix door 10 is provided at the front of the heater core 9. The ratio of air to pass through the heater core 9 and air to bypass the heater core 9 in the air that has passed through the evaporator 8 is adjusted by the air-mix door 10.

The air that has been temperature controlled by the evaporator 8 and the heater core 9 is then blown into the cabin through outlets (a defrost outlet 12a, a vent outlet 12b, a foot outlet 12c) that are opened and closed by mode doors 11a, 11b and 11c provided at the downstream-most side of the air conditioning duct system 1.

A first PTC heater 13 and a second PTC heater 14 are provided at the downstream side of the heater core. The first PTC heater 13 is provided behind and near the heater core 9 to heat of all air that has passed through the heater core 9 so that the warm air can be supplied to the individual outlets, whereas the second PTC heater 14 is provided further downstream than the mode door 11c of the foot outlet 12c to heat only the air guided to the foot outlet 12c.

The first and second PTC heaters 13 and 14 are connected to a power source 17 (such as a battery) via contact points 15a and 16a of a first relay 15 and a second relay 16 respectively. An exciting coil 15b of the first relay 15 is connected to the power source 17 via a first switch (SW1) 18 which is normally open, and an exciting coil 16b of the second relay 16 is connected to the power source 17 via a second switch (SW2) 19 which is normally closed. The first switch 18 is connected to the second switch 19 in series.

The air mix door 10 interlocks with a temperature control lever 21 of a control panel 20, and by setting the temperature control lever to HOT, the air mix door 10 is set at the degree of openness (=100%) at which all of the intake air is guided to the heater core 9. As the temperature control lever 21 is moved toward COLD, the degree of openness is gradually reduced. By setting the temperature control lever 21 to the COLD position, the air mix door 10 is set at the degree of openness (=0%) at which no air passes through the heater core 9.

In addition, the mode doors 11a, 11b and 11c interlock with a mode switching lever 22, and when the mode switching lever is set at the DEF position, only the defrost outlet 12a opens with the vent outlet 12b and the foot outlet 12c closed. When the lever 22 is set at the DEF/FOOT position, the mode doors 11a and 11c for opening and closing the defrost outlet 12a and the foot outlet 12c are respectively set to approximately half open while the vent outlet 12b remains closed so that 50~60% of the entire air quantity is discharged through the foot outlet 12c and the remaining air is discharged through the defrost outlet 12a. When the mode switching lever 22 is set at the FOOT position, a state is achieved in which the vent outlet 12b is closed, the foot outlet 12c is fully open and the defrost outlet 12a is slightly open so that 70~80% of the entire quantity of air is supplied to the foot outlet 12c and the remaining air is sent to the defrost outlet 12a.

A request to set the discharge mode to the BI-LEVEL mode (BI/L) or the VENT mode (VENT) rarely arises during the initial stage of heating. However if the discharge mode is set to the BI-LEVEL mode (BI/L), the defrost outlet 12a is closed with the vent outlet 12b and the foot outlet 12c set to open, whereas if it is set to the VENT mode (VENT), the defrost outlet 12a and the foot outlet 12c are closed with only the vent outlet 12b set to open.

Figure 2:
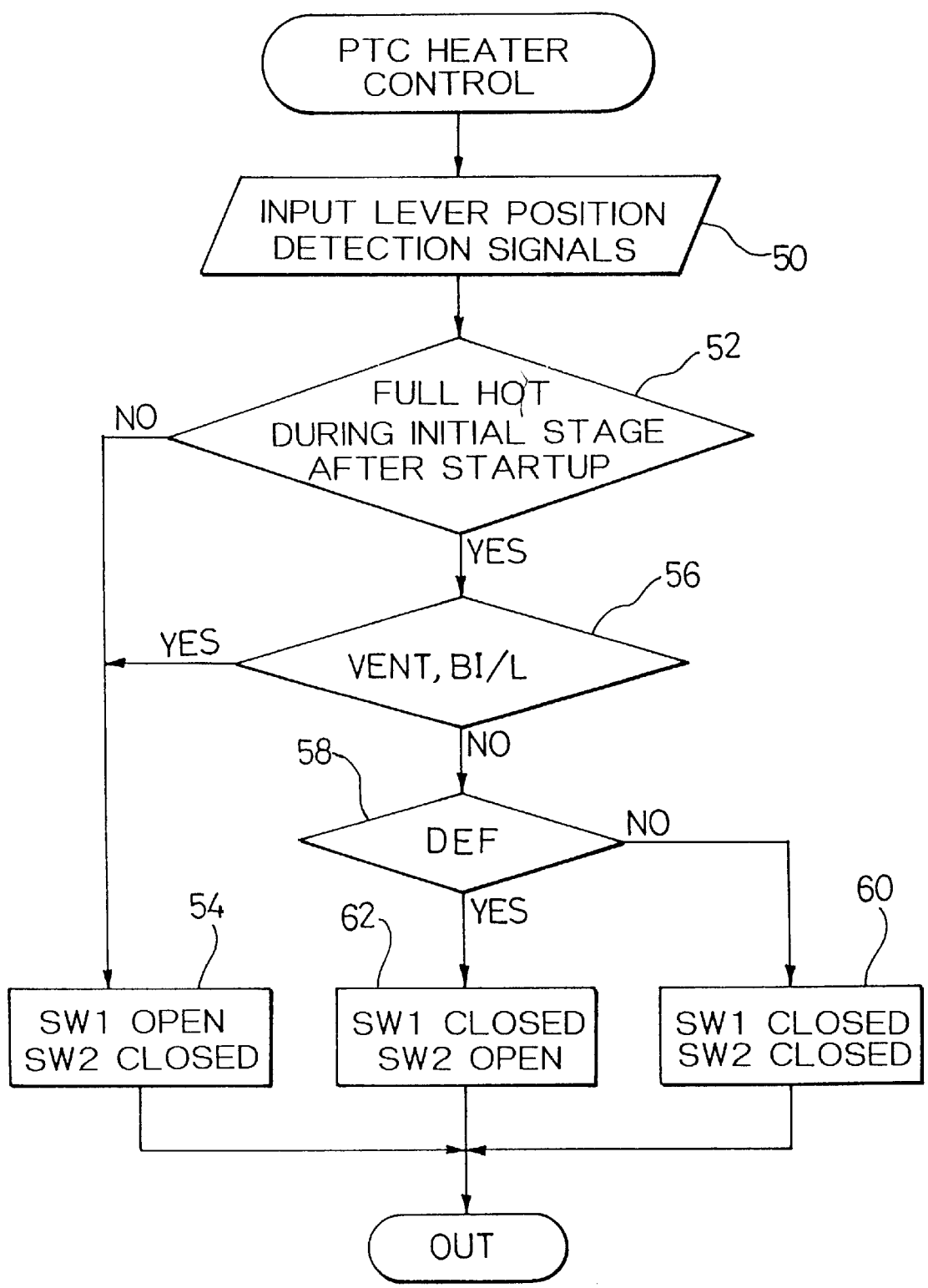
FIG. 2 is a flowchart illustrating an example of a control operation performed by the switch control unit 23 shown in FIG. 1.

Moreover, the first and second switches 18 and 19 detect the discharge mode selected at the mode switching lever 22. These switches are controlled by a switch control unit 23 that outputs operating instructions that correspond to the discharge mode during the initial stage of heating. This switch control unit 23 may be constituted entirely of an electrical circuit or it may include a structure in which a switch control program is processed by a microcomputer. For instance, FIG. 2 presents a flowchart that illustrates an example in which the switches 18 and 19 are controlled by a microcomputer to ultimately control the first and second PTC heaters 13 and 14.

During the initial stage after ignition-on, signals related to temperature control and the discharge mode that correspond to the positions of the temperature control lever 21 and the mode switching lever 22 are input to the switch control unit 23 (step 50). Therefore the switch control unit 23 can make a decision as to whether or not the operation is under full hot conditions, in which the degree of openness of the air mix door is set to 100% with the temperature control lever 21 set to the HOT position (step 52). If the operation is not under fill hot conditions during the initial stage after startup, it is decided that there is no request for the PTC heaters and the PTC heaters are not started from their initial state (the first switch 18 is open and the second switch 19 is closed) (step 54). However if the operation is under full hot conditions during the initial stage after startup, the discharge mode selected with the mode switching lever 22 is detected (steps 56 and 58) and the switches 18 and 19 are controlled in corresponding to the discharge mode in the following manner.

First, if the discharge mode is set to the VENT mode or the BI-LEVEL mode, the first and second switches 18 and 19 are left in their initial states (the first switch 18 is open and the second search 19 is closed) since neither of these modes is normally set during the initial stage of heating (step 54). If the FOOT mode or the DEF/FOOT mode is set, the first switch 18 is closed while the second switch 19 is left in its initial state (closed) (step 60). If the DEFROST mode is set, the first switch 18 is closed and the second switch 19 is set to open (step 62).

Consequently, regardless of whether or not the operation is at the initial stage of heating, if the discharge mode is set to the VENT mode or the BI-LEVEL mode, normal control is performed, and the PTC heaters do not operate. However, if the temperature control lever 21 is set to HOT and the discharge mode is set to the FOOT mode during the initial stage of heating, the first switch is closed to supply power to the exciting coils 15b and 16b of the relays 15 and 16 respectively. Therefore the contact points 15a and 16a of the relays will be closed to supply power to the first and second PTC heaters 13 and 14. In this discharge mode, the foot outlet 12c is fully open and the defrost outlet 12a is slightly open, and the air to be discharged through the foot outlet 12c is heated by the first PTC heater 13 after it passes through the heater core 9. The air is then further heated by the second PTC heater 14. In addition, a small quantity of air that has been heated by the first PTC heater 13 is discharged through the defrost outlet 12a as well.

If the discharge mode is set to the DEF/FOOT mode during the initial stage of heating, power is supplied to the first and second PTC heaters 13 and 14 as in the FOOT mode. Since, in this discharge mode, the mode doors 11c and 11a for opening and closing the foot outlet 12c and the defrost outlet 12a are set to an intermediate state of openness, approximately half of the air that has passed through the heater core 9 and heated by the first PTC heater 13 is guided to the foot outlet 12c to be further heated by the second PTC heater 14 before it is discharged. The remaining half of the air that has been heated by the first PTC heater 13 is discharged through the defrost outlet 12a along the windshield 30. Consequently, the intake air is divided into two almost equal portions to be supplied to the windshield and the foot level. Since the air discharged through the foot outlet 12c has a higher temperature than that of the air discharged at the defrost outlet 12a, a comfortable air conditioned environment is achieved for the passengers, in which the feet are warmed and the head is not subject to a direct flow of hot air.

If the discharge mode is set to the DEFROST mode during the initial stage of heating, all the air that has passed through the heater core 9 is discharged through the defrost outlet 12a after it is heated by the first PTC heater 13. As a result, even during the initial stage of heating, in which heating by the heater core 9 is not sufficient, some warm air can be supplied along the windshield 30, thereby achieving an improvement in the defrosting capability in cold weather. In addition, since the power supply to the second PTC heater 14 is cut-off, the problem of having to supply power to all the PTC heaters, even when the foot outlet 12c is closed to stop air discharge at the foot level, is eliminated, thereby preventing wasteful consumption of power.

Figure 3:
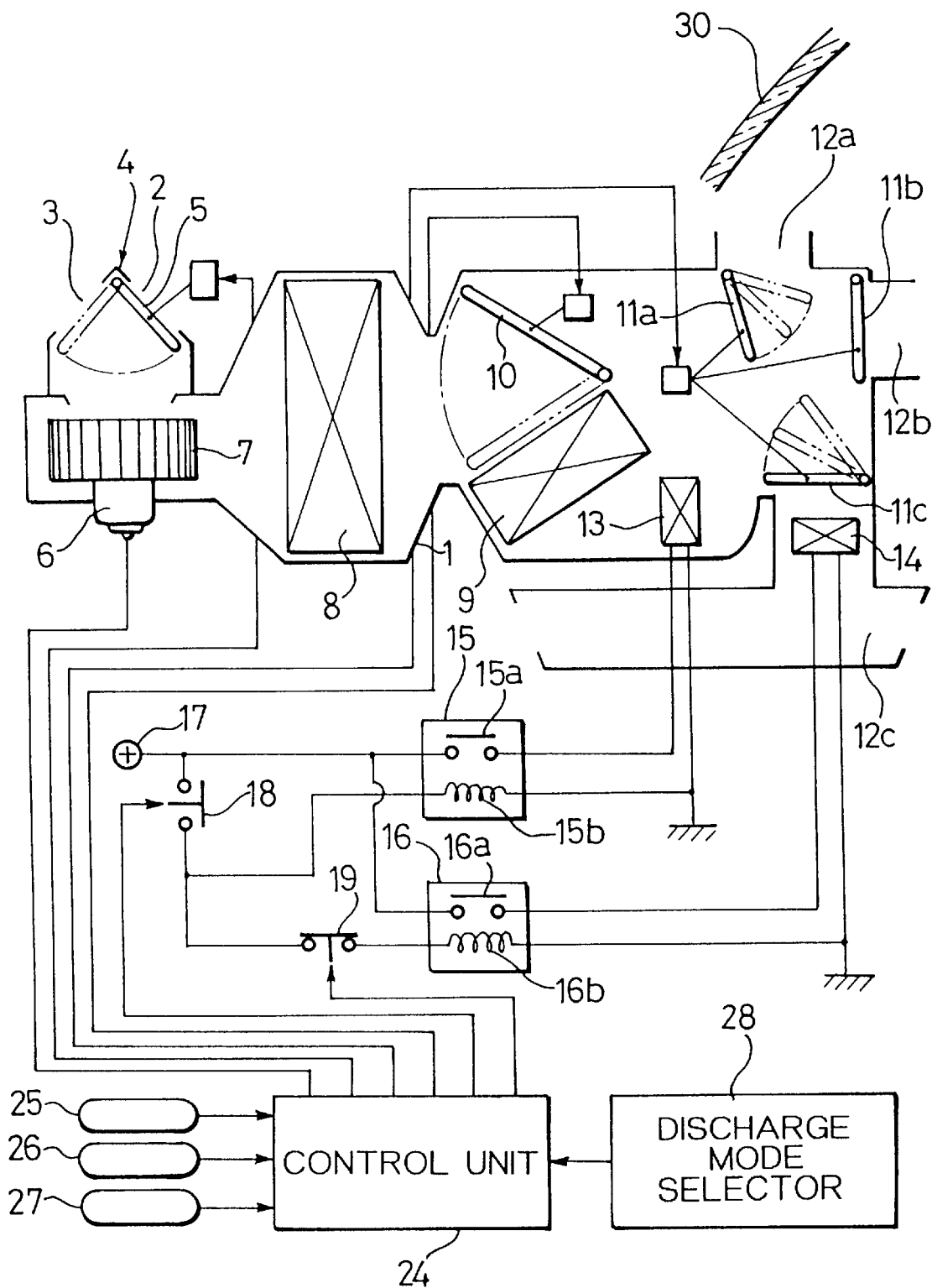
FIG. 3 illustrates another structural example of the air conditioning control apparatus for vehicles according to the present invention.

FIG. 3 illustrates a structural example in which the air blower 7, the intake door 5, the air mix door 10, the mode doors 11a~11c and the first and second switches 18 and 19 are drive-controlled with control signals provided by the control unit 24. This control unit 24, is provided with a microcomputer having a CPU, a ROM, a RAM and the like of the known art, an input/output port for signals, a drive control circuit and the like. In this control unit 24 various input signals (signals from a cabin temperature sensor 25 that detects the temperature in the cabin, an outside air temperature sensor 26 that detects the temperature ofthe outside air, a temperature setting device 27 that sets a target temperature for the cabin and the like) are input based upon a specific program which is provided in advance. The control unit 24 then processes a control signal based upon these signals to drive control the individual doors 5, 10 and 11a~11c, the air blower 7, the first and second switches 18 and 19 and the like.

In addition, a signal from a discharge mode setting device 28 that sets the discharge mode through manual operation is input to the control unit 24. If the discharge mode has been selected manually, the discharge mode selected manually overrides the discharge mode that has been processed based upon various signals.

FIG. 4 presents a flowchart illustrating an example in which the control unit 24 controls power supply to the PTC heaters 13 and 14. The control unit 24 enters this processing routine immediately after the ignition switch is turned on. Signals indicating various types of information such as the cabin temperature, the outside air temperature, the target temperature and the like, and the signal from the discharge mode setting device 28 are input to the control unit 24 (step 70). The control unit 24 processes these signals to make a decision as to whether or not there is a request for heating the cabin (heat shortage) during the initial stage after startup at which the ignition switch has been turned on (step 72).

If there has been no request for heating during the initial stage after startup, the optimal discharge mode for the cabin is processed and set based upon the various types of information such as the cabin temperature, the outside air temperature, the target temperature and the like (step 74). It is assumed that there is no request for using the PTC heaters at all, leaving the PTC heaters in their initial states (the first switch 18 open and the second switch 19 closed) (step 76). In contrast, if there is a request for heating during the initial stage after startup, the air mix door 10 is set to the full hot position (step 78), the discharge mode that has been selected through automatic calculation based upon the input information or through manual operation of the discharge mode setting device 28 is detected (steps 80 and 82), and the mode doors 11a~11c and the switches 18 and 19 are controlled in correspondence to the selected discharge mode.

First, if the discharge mode is set to the VENT mode or the BI-LEVEL mode, the mode doors 11a~11c are set to positions at which the VENT mode or the BI-LEVEL mode is achieved (step 84), with the first and second switches 18 and 19 left in their initial states (the first switch 18 open and the second switch 19 closed) (step 76). If the discharge mode is set to the FOOT mode or the DEF/FOOT mode, the mode doors 11a~11c are set to positions at which the FOOT mode or the DEF/FOOT mode is achieved (step 86), with the first switch 18 closed and the second switch 19 left in its initial state (closed) (step 88), and if the DEFROST mode is set, the mode doors are set to positions at which the DEFROST mode is achieved (step 90), with the first switch 18 closed and the second switch 19 open (step 92).

As a result, in this example, regardless of whether or not the operation is at the initial stage of heating, if the discharge mode is set to the VENT mode or the BI-LEVEL mode, normal control is performed without operating the PTC heaters 13 and 14. However if the discharge mode is set to the FOOT mode or the DEF/FOOT mode during the initial stage of heating, power is supplied to the first and second PTC heaters 13 and 14, and if the discharge mode is set to the DEFROST mode during the initial stage of heating, only the first PTC heater 13 is supplied with power. Thereby, advantages are achieved similar to those achieved by the previous structural example.

As has been explained, according to the present invention, since a plurality of PTC heaters are provided at the downstream side of the heater core and some of the PTC heaters are positioned at the foot outlet, power is supplied to all the PTC heaters if the discharge mode in which the foot outlet is set to open is selected. Power supply to the PTC heaters positioned at the foot outlet is cut-off if a discharge mode in which the foot outlet is closed is selected. A sufficiently heated flow of air can be supplied if air is to be discharged through the foot outlet during the initial stage of heating, and warm air can be supplied when air is to be discharged through the defrost outlet as well. Thereby prompt removal of frost and fog from the windshield is achieved.

Furthermore, since the temperature of the warm air discharged through the foot outlet is higher than the temperature of the warm air discharged through the defrost outlet, temperature control that gives priority to providing passengers with a comfortable feeling of warmth is achieved while taking into consideration the necessity for removing frost and fog from the windshield. In addition, heated air can be discharged to warm the feet with no uncomfortable flow of hot air to the head.

Moreover, since power supply to the PTC heaters positioned at the foot outlet is cut-off when a discharge mode in which the foot outlet is closed (such as the DEFROST mode) is selected during the initial stage of heating, appropriate power management can be implemented to suit the modes in which the PTC heaters positioned at the foot outlet contribute to heating of discharge air and other modes, thereby achieving economical use of energy.

What is claimed is:

1. An air conditioning control apparatus comprising:

a duct having an upstream end and a downstream end, said upstream end including an internal air induction port and an external air induction port, said downstream end including a foot outlet, a defrost outlet, and a vent outlet;

an air blower provided in said duct such that said air blower moves air through said duct from said upstream end to said downstream end, wherein the air enters said duct through at least one of said internal air induction port and said external air induction port;

a heater core provided in said duct such that said heater core heats the air in said duct, wherein said heater core heats the air by using engine cooling water as a heat source;

a foot outlet opening/closing mechanism provided at said foot outlet, wherein said foot outlet opening/closing mechanism opens and closes said foot outlet;

a defrost outlet opening/closing mechanism provided at said defrost outlet, wherein said defrost outlet opening/closing mechanism opens and closes said defrost outlet;

a vent outlet opening/closing mechanism provided at said vent outlet, wherein said vent outlet opening/closing mechanism opens and closes said vent outlet;

said opening/closing mechanisms being capable of being arranged in a vent mode, wherein said vent outlet is open and said defrost outlet and said foot outlet are closed;

said opening/closing mechanisms being capable of being arranged in a foot mode, wherein said foot outlet is open and said defrost outlet and said vent outlet are closed;

said opening/closing mechanisms being capable of being arranged in a defrost mode, wherein said defrost outlet is open and said foot outlet and said vent outlet are closed;

said opening/closing mechanisms being capable of being arranged in a bi-level mode, wherein said vent outlet and said foot outlet are open and said defrost outlet is closed;

a first PTC heater provided in said duct downstream of said heater core, wherein said PTC heater is positioned such that said PTC heater can heat air flowing to said foot outlet and said defrost outlet;

a second PTC heater provided in said foot outlet; and a control unit for determining a shortage of heat generated by said heater core, and for supplying electricity to said first PTC heater and said second PTC heater when said control unit determines a shortage of heat generated by said heater core and said opening/closing mechanisms are arranged in said foot mode, and for supplying electricity to only said first PTC heater when said control unit determines a shortage of heat generated by said heater core and said opening/closing mechanisms are arranged in said defrost mode.

2. The apparatus of claim 1, further comprising a cabin temperature sensor for detecting a cabin temperature, an outside air temperature sensor for detecting an outside air temperature, and a temperature setting device for setting a cabin target temperature, wherein said sensors provide input signals to said control unit.

3. The apparatus of claim 1, wherein said apparatus is employable in a vehicle comprising an engine, said apparatus being capable of operating in a full hot temperature mode, wherein when said control unit determines that the engine has been stared and the full hot temperature mode has been selected, said control unit determines a shortage of heat generated by said heater core.

4. The apparatus of claim 1, further comprising an air mix door upstream of said heater core, said air mix door being capable of movement for adjustment of air flow through said heater core, said apparatus being capable of being operated in a full hot temperature mode, wherein when the full hot temperature mode is selected, said air mix door is positioned such that all air flowing through said duct passes through said heater core.

5. The apparatus of claim 1, wherein said opening/closing mechanisms are capable of being arranged in a def-foot mode, wherein said defrost outlet and said foot outlet are open and said vent outlet is closed, and wherein said control unit supplies electricity to said first PTC heater and said second PTC heater when said control unit determines a shortage of heat generated by said heater core and said opening/closing mechanisms are arranged in said def-foot mode.

6. The apparatus of claim 5, wherein said second PTC heater is provided downstream of said foot outlet opening/closing mechanism.

7. The apparatus of claim 6, wherein said apparatus is employable in a vehicle comprising an engine, said apparatus being capable of operating in a full hot temperature mode, wherein when said control unit determines that the engine has been started and the full hot temperature mode has been selected, said control unit determines a shortage of heat generated by said heater core.

8. The apparatus of claim 7, further comprising an air mix door upstream of said heater core, said air mix door being capable of movement for adjustment of air flow through said heater core, wherein when the full hot temperature mode is selected, said air mix door is positioned such that all air flowing through said duct passes through said heater core.

9. The apparatus of claim 5, wherein said apparatus is employable in a vehicle comprising an engine, said apparatus being capable of operating in a full hot temperature mode, wherein when said control unit determines that the engine has been started and the full hot temperature mode has been selected, said control unit determines a shortage of heat generated by said heater core.

10. The apparatus of claim 9, further comprising an air mix door upstream of said heater core, said air mix door being capable of movement for adjustment of air flow through said heater core, wherein when the full hot temperature mode is selected, said air mix door is positioned such that all air flowing through said duct passes through said heater core.

11. The apparatus of claim 11, wherein said second PTC heater is provided downstream of said foot outlet opening/closing mechanism.

12. The apparatus of claim 11, wherein said apparatus is employable in a vehicle comprising an engine, said apparatus being capable of operating in a full hot temperature mode, wherein when said control unit determines that the engine has been stared and the full hot temperature mode has been selected, said control unit determines a shortage of heat generated by said heater core.

13. The apparatus of claim 12, further comprising an air mix door upstream of said heater core, said air mix door being capable of movement for adjustment of air flow through said heater core, wherein when the full hot temperature mode is selected, said air mix door is positioned such that all air flowing through said duct passes through said heater core.

* * * * *